(12) United States Patent
Mizuno

(10) Patent No.: US 11,885,426 B2
(45) Date of Patent: Jan. 30, 2024

(54) LIQUID FLOW PATH MEMBER AND METHOD FOR MANUFACTURING LIQUID FLOW PATH MEMBER

(71) Applicant: SEIKO EPSON CORPORATION, Tokyo (JP)

(72) Inventor: Takayoshi Mizuno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 594 days.

(21) Appl. No.: 16/951,468

(22) Filed: Nov. 18, 2020

(65) Prior Publication Data

US 2021/0156488 A1    May 27, 2021

(30) Foreign Application Priority Data

Nov. 22, 2019  (JP) .................. 2019-211162

(51) Int. Cl.
| | | |
|---|---|---|
| *F16K 27/10* | (2006.01) | |
| *B23K 26/18* | (2006.01) | |
| *B23K 26/21* | (2014.01) | |
| *B23K 26/57* | (2014.01) | |
| *B23K 101/04* | (2006.01) | |

(52) U.S. Cl.
CPC ............ *F16K 27/102* (2013.01); *B23K 26/18* (2013.01); *B23K 26/21* (2015.10); *B23K 26/57* (2015.10); *B23K 2101/04* (2018.08)

(58) Field of Classification Search
CPC .............. F16K 15/148; F16K 27/0209; F16K 27/0236; F16K 27/10; F16K 27/102; Y10T 137/0491; Y10T 137/0497; B23K 26/50; B23K 26/57; B23K 26/20; B23K 26/206; B23K 26/21; B23K 26/24; B23K 26/28; B23K 26/32; B23K 26/324; B23K 15/0046; B23K 15/0053; B23K 15/0093; B23K 2101/04; B29C 65/1635; B29C 65/1638
See application file for complete search history.

(56) References Cited

U.S. PATENT DOCUMENTS

| | | | | |
|---|---|---|---|---|
| 4,729,401 | A | * | 3/1988 | Raines ................. F16K 15/148 604/246 |
| 9,423,043 | B2 | * | 8/2016 | Perner ................. B29C 65/1635 |
| 10,449,766 | B2 | | 10/2019 | Hanagami et al. |

(Continued)

FOREIGN PATENT DOCUMENTS

| | | |
|---|---|---|
| CN | 105051435 | 11/2015 |
| DE | 102017106889 | 10/2018 |

(Continued)

*Primary Examiner* — Hailey K. Do
(74) *Attorney, Agent, or Firm* — WORKMAN NYDEGGER

(57) ABSTRACT

A method for manufacturing a check valve unit as a liquid flow path member, in which the liquid flow path member includes, in a flow path direction of ink, a first flow path member constituting one side of a flow path, a second flow path member constituting another side of the flow path, and a check valve including a valve body configured to stop a backflow of the ink in the flow path and a check valve holding member configured to hold the valve body, the method includes a welding step for welding the first flow path member or the second flow path member, and the check valve holding member together, and also welding the first flow path member and the second flow path member together.

3 Claims, 7 Drawing Sheets

(56) References Cited

U.S. PATENT DOCUMENTS

2010/0086761 A1\*  4/2010  Okuda ................ B29C 65/1616
                                                            428/220
2018/0079213 A1    3/2018  Hanagami et al.

FOREIGN PATENT DOCUMENTS

| JP | 2007-058395 | 3/2007 |
| JP | 2014-177051 | 9/2014 |
| JP | 2015-178211 | 10/2015 |
| JP | 2018-047599 | 3/2018 |
| WO | 2019/088058 | 5/2019 |

\* cited by examiner

LIQUID FLOW PATH MEMBER AND METHOD FOR MANUFACTURING LIQUID FLOW PATH MEMBER

The present application is based on, and claims priority from JP Application Serial Number 2019-211162, filed Nov. 22, 2019, the disclosure of which is hereby incorporated by reference herein in its entirety.

BACKGROUND

1. Technical Field

The present disclosure relates to a liquid flow path member and a method for manufacturing a liquid flow path member.

2. Related Art

Hitherto, a check valve unit including a check valve in a liquid flow path has been known, for example, as disclosed in JP-A-2015-178211.

However, JP-A-2015-178211 describing the check valve unit, does not specifically describe a method for joining a cylindrical valve seat that is a constituent element of the check valve and a cylindrical check valve installation section for installing the valve seat inside. For example, the valve seat may be disengaged from the check valve installation section due to the stress of pressurizing and depressurizing liquid, which may result in poor durability.

SUMMARY

A method for manufacturing a liquid flow path member, in which a liquid flow path member includes, in a flow path direction of liquid, a first flow path member constituting one side of a liquid flow path, a second flow path member constituting another side of the liquid flow path, and a check valve including a valve body configured to stop a backflow of the liquid in the liquid flow path and a check valve holding member configured to hold the valve body, the method includes a welding step for welding the first flow path member or the second flow path member, and the check valve holding member together, and also welding the first flow path member and the second flow path member together.

A liquid flow path member includes, in a flow path direction of liquid, a first flow path member constituting one side of a liquid flow path, a second flow path member constituting another side of the liquid flow path, and a check valve including a valve body configured to stop a backflow of the liquid in the liquid flow path and a check valve holding member configured to hold the valve body, in which the first flow path member and the check valve holding member are formed of a laser light absorbing material, the second flow path member is formed of a laser light transmissive material, and the first flow path member and the second flow path member are welded together, and the second flow path member and the check valve holding member are welded together.

DESCRIPTION OF EXEMPLARY EMBODIMENTS

1. Embodiment 1

Figure 1:
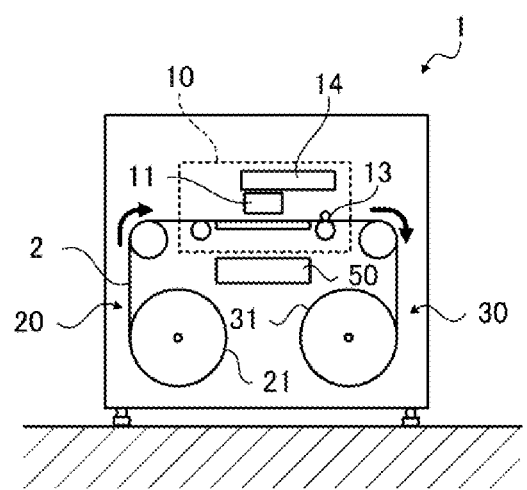
FIG. 1 is a front view schematically illustrating an inkjet printer including a check valve unit as a liquid flow path member according to Embodiment 1 in an ink supply unit.
Figure 2:
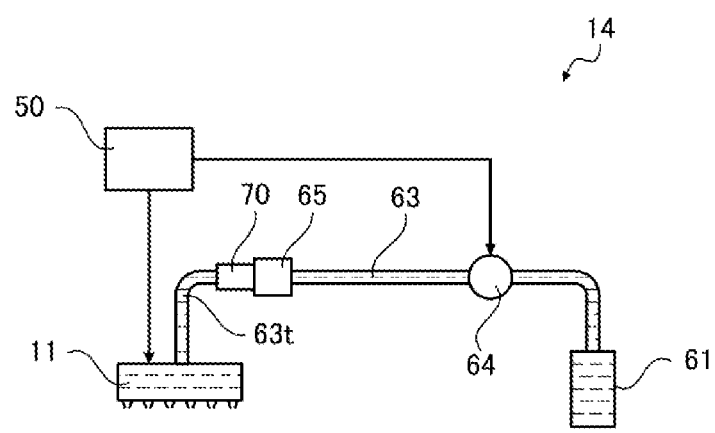
FIG. 2 is a conceptional diagram illustrating a configuration of the ink supply unit.

First, an inkjet printer 1 provided with a liquid flow path member according to Embodiment 1 will be described below with reference to FIGS. 1 and 2. The liquid flow path member is provided in, for example, an ink supply unit 14 included in the inkjet printer 1 as illustrated in FIG. 1.

The inkjet printer 1 is an inkjet-type printer that prints an image on a printing medium 2 supplied in a rolled state by ejecting ink as a liquid. The inkjet printer 1 includes, for example, a printing unit 10, a supply unit 20, a storage unit 30, and a control unit 50.

The printing unit 10 is a unit configured to form an image on the printing medium 2 in accordance with a control signal from the control unit 50 based on information of an image to be printed. The printing unit 10 includes an ejecting head 11, a driving roller 13, the ink supply unit 14, and the like.

The ejecting head 11 includes a nozzle configured to eject the ink onto a surface of the printing medium 2 under the control of the control unit 50, and is provided for each color of the ink to be ejected. Note that the ejecting head 11 may be a constituent element of a line head that is arranged so as to be fixed across a width direction of the printing medium 2, or may be a constituent element of a serial head that is mounted on a movable carriage and ejects the ink while moving in the width direction of the printing medium 2.

Under the control of the control unit 50, the driving roller 13 is rotated by a driving motor that is driven as an image is formed, and transports the printing medium 2.

The ink supply unit 14 is a mechanism configured to supply the ink to be ejected to each of the plurality of ejecting heads 11. As illustrated in FIG. 2, the ink supply unit 14 includes a tank 61 configured to store the ink, an ink supply path 63 from the tank 61 to the ejecting head 11, a pump 64 configured to supply the ink in the ink supply path 63, a filter 65 configured to remove foreign material in the ink in the ink supply path 63, a check valve unit 70 as a liquid flow path member configured to stop a backflow of the ink in the ink supply path 63, and the like. FIG. 2 illustrates constituent elements of the ink supply unit 14 corresponding to the one ejecting head 11 among the ejecting heads 11 provided for respective colors of the plurality of ink to be ejected. The constituent elements such as the tank 61, the ink supply path 63, the pump 64, the filter 65, the check valve unit 70, and the like are provided independently for each color of ink to be supplied.

Note that the ink supply unit 14 may include a cartridge holder capable of mounting a cartridge container, instead of the tank 61.

The supply unit 20 is a unit configured to store and supply the printing medium 2 before printing, is located upstream of the printing unit 10 in the transport path for the printing medium 2, and includes a supply reel 21 configured to load the printing medium 2.

The storage unit 30 is a unit configured to wind and store the printing medium 2 after printing, is located downstream of the printing unit 10 in the transport path for the printing medium 2, and includes a take-up reel 31 configured to wind the printing medium 2.

The control unit 50 includes a CPU, a memory, an interface coupled to an external electronic device, and a driving circuit configured to drive the printing unit 10, the supply unit 20, the storage unit 30, and the like. For example, the control unit 50 controls the printing unit 10, the supply unit 20, the storage unit 30, and the like based on the image data received from the external electronic device and the information designating the printing specifications to form a desired printed image on the printing medium 2 and make a printed material.

Note that, as a printing medium, the printing medium 2 supplied in the rolled state is described as an example, but a single-cut type printing medium may be used. When targeting the single-cut type printing medium, the supply unit includes a supply mechanism including a separator configured to supply the printing medium to the printing unit 10 one by one. Further, the storage unit includes a storage tray configured to store the printing medium discharged from the printing unit 10 after printing, and the like.

Next, the check valve unit 70 as the liquid flow path member according to Embodiment 1 will be described with reference to FIGS. 2 and 3.

The check valve unit 70 is provided at a position in the ink supply path 63 where the filter 65 and a tube 63t constituting the ink supply path 63 to the ejecting head 11 are coupled. For example, the check valve unit 70 has a function of preventing the ink from leaking out from the detached tube 63t when replacing the filter 65. The check valve unit 70 includes a first flow path member 71, a second flow path member 72, and a check valve 73.

In a direction of an ink flow path as a liquid flow path formed inside the check valve unit 70, the first flow path member 71 is a tubular body that constitutes one side of the flow path, specifically an upstream side through which the ink flows. The flow path direction of the ink is indicated by arrows in FIG. 3.

A tip end region on the upstream side of the first flow path member 71 is formed so that an outer diameter becomes smaller toward the tip end, and is configured so as to be easily inserted into an ink discharge port of the filter 65. In addition, when the first flow path member 71 is inserted into the ink discharge port of the filter 65 by a predetermined length, the check valve unit 70 is firmly retained by the filter 65 by fitting the first flow path member 71 and the ink discharge port of the filter 65. Note that the description of the structure of the ink discharge port of the filter 65 and the fitting structure of the first flow path member 71 and the ink discharge port will be omitted.

The first flow path member 71 is formed of a laser light absorbing material. Specifically, as a preferable example, the first flow path member 71 is formed of a polypropylene resin containing carbon black particles.

In the direction of the ink flow path formed inside the check valve unit 70, the second flow path member 72 is a tubular body that constitutes another side of the flow path, specifically a downstream side through which the ink flows.

A tip end region on the downstream side of the second flow path member 72 is formed so that an outer diameter becomes smaller toward the tip end, and is configured to fit into the tube 63t that constitutes the ink supply path 63 to the ejecting head 11. In addition, when the second flow path member 72 is inserted into the tube 63t by a predetermined length, the tube 63t is not easily disengaged due to the frictional resistance caused by the shrinkage force of the tube 63t.

The second flow path member 72 is formed of a laser light transmissive material. Specifically, as a preferable example, the second flow path member 72 is formed of a transparent polypropylene resin that transmits laser light.

The check valve 73 includes a valve body 74 configured to stop a backflow of the ink in the ink flow path formed inside the check valve unit 70, and a check valve holding member 75 configured to hold the valve body 74.

The valve body 74 is formed of a shaft portion 74a and an umbrella portion 74b which are integrally molded and are made of a rubber material. The shaft portion 74a is inserted into and supported by a bearing 75a provided in a central portion of the check valve holding member 75.

Due to the deformation of the umbrella portion 74b, passage holes 75b provided in the check valve holding member 75 can be opened and closed. Due to the pressure of the ink flowing from the first flow path member 71 toward the second flow path member 72, the umbrella portion 74b is deformed in an opening direction, thereby causing the passage holes 75b to be in an open state. On the contrary, due to the pressure of the ink flowing back from the second flow path member 72 toward the first flow path member 71, the umbrella portion 74b covers the passage holes 75b, thereby causing the passage holes 75b to be in a closed state.

The check valve holding member 75 is arranged between the first flow path member 71 and the second flow path member 72 in the flow path direction of the ink, and is provided so that an outer periphery in plan view from the ink flow path direction fits into an inner periphery of an end region on the downstream side of the first flow path member 71. In addition, the check valve holding member 75 includes the bearing 75a configured to support the valve body 74 in a central portion in plan view from the flow path direction of the ink, and includes the plurality of passage holes 75b around the bearing 75a through which the ink passes.

Similar to the first flow path member 71, the check valve holding member 75 is formed of the laser light absorbing material.

The first flow path member 71 and the second flow path member 72, and the second flow path member 72 and the check valve holding member 75 are welded together in a welding step included in a manufacturing step of the check valve unit 70 described below.

A method for manufacturing the check valve unit 70 will be described with reference to FIGS. 4 to 6.

The manufacturing method in Embodiment 1 includes the welding step for welding the second flow path member 72 and the check valve holding member 75 together, and also welding the first flow path member 71 and the second flow path member 72 together. Additionally, in the welding step, laser welding is performed as an appropriate example.

Details will be described below.

Figure 4:
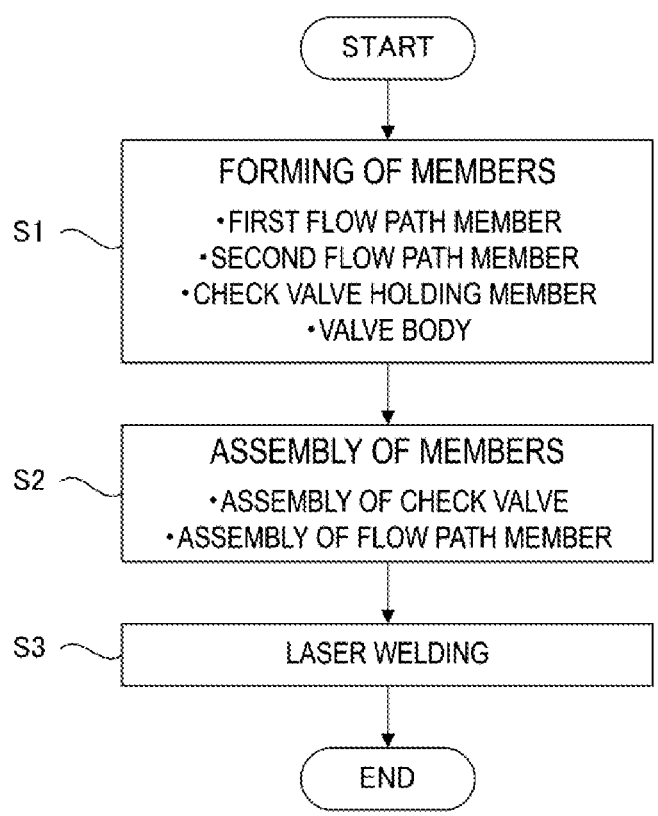
FIG. 4 is a flow chart of a manufacturing step of the check valve unit as the liquid flow path member.

First, in step S1 of the flowchart shown in FIG. 4, the respective members constituting the check valve unit 70 is formed.

Specifically, the first flow path member 71 and the check valve holding member 75 are formed of the laser light absorbing material, and the second flow path member 72 is formed of the laser light transmissive material. In addition, the valve body 74 is formed of the rubber material.

Figure 5:
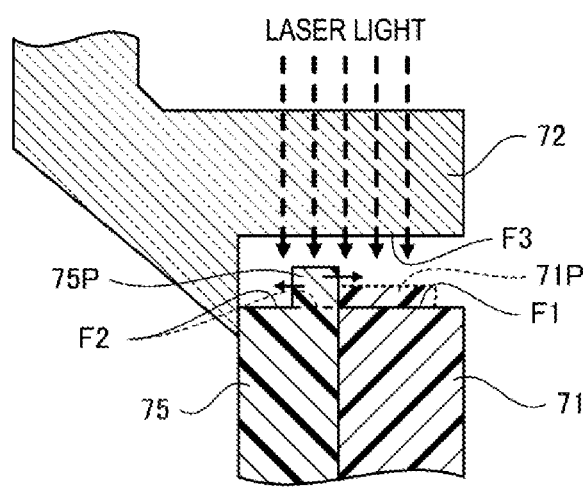
FIG. 5 is a cross-sectional view illustrating joining surfaces before welding respective members in a portion A of FIG. 3.

Here, when forming the check valve holding member 75, as illustrated in FIG. 5, a convex portion 75P protruding around an entire periphery of the outside the ink flow path is formed on a joining surface F2 of the check valve holding member 75 that is joined to the second flow path member 72. In other words, the check valve holding member 75 is formed in a shape provided with the convex portion 75P protruding around the entire periphery of the ink flow path on the joining surface F2 of the check valve holding member 75 that is joined to the second flow path member 72. Additionally, the first flow path member 71 may also be formed in a shape provided with a convex portion 71P protruding around an entire periphery of the ink flow path on a joining surface F1 of the first flow path member 71 that is joined to the second flow path member 72. However, a protruding height of the convex portion 71P is formed so as to be lower than a protruding height of the convex portion 75P. That is, when assembling the respective members, an end surface of the convex portion 75P is formed closer to a joining surface F3 of the second flow path member 72 than an end surface of the convex portion 71P, or the end surface of the convex portion 75P is formed so as to contact the joining surface F3 of the second flow path member 72.

Note that the joining surface F2 of the check valve holding member 75, the joining surface F1 of the first flow path member 71, and the joining surface F3 of the second flow path member 72 are formed as surfaces extending in a direction intersecting the flow path direction of the ink. In addition, since the convex portion 75P is provided on the joining surface F2 of the check valve holding member 75 that is joined to the second flow path member 72, a surface that is actually joined and welded in a subsequent welding step is a joined surface formed by melting the convex portion 75P protruding from the joining surface F2. Similarly, when the convex portion 71P is provided on the joining surface F1 of the first flow path member 71 that is joined to the second flow path member 72, a surface that is actually joined and welded in the welding step is a joined surface formed by melting the convex portion 71P protruding from the joining surface F1.

Next, in step S2, the respective formed members are assembled.

Figure 3:
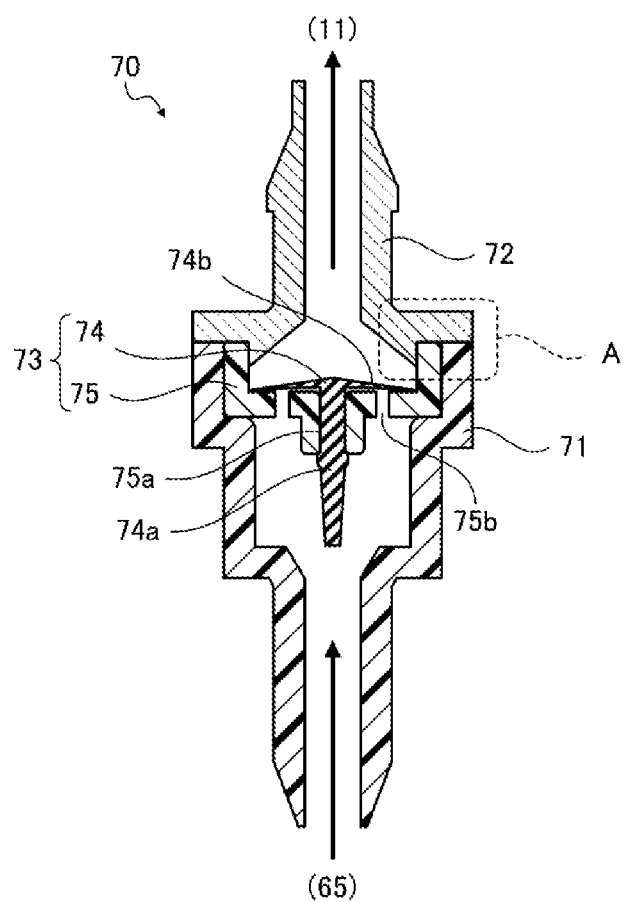
FIG. 3 is a cross-sectional view illustrating a configuration of the check valve unit as the liquid flow path member according to Embodiment 1.

Specifically, as illustrated in FIG. 3, the valve body 74 is fitted to the check valve holding member 75 to constitute the check valve 73, and the check valve 73 is assembled to the first flow path member 71. Further, the first flow path member 71 to which the check valve 73 is assembled is combined with the second flow path member 72, so that the joining surface F2 of the check valve holding member 75 and the joining surface F1 of the first flow path member 71 face the joining surface F3 of the second flow path member 72.

Next, in step S3, as the welding step, the second flow path member 72 and the check valve holding member 75 are welded together, and the first flow path member 71 and the second flow path member 72 are also welded together.

Specifically, as illustrated in FIG. 5, by melting the joining surface F1 of the first flow path member 71 that is joined to the second flow path member 72, with the laser light passing through the second flow path member 72, the first flow path member 71 and the second flow path member 72 are welded together, and by melting the joining surface F2 of the check valve holding member 75 that is joined to the second flow path member 72, with the laser light passing through the second flow path member 72, the check valve holding member 75 and the second flow path member 72 are welded together.

Figure 6:
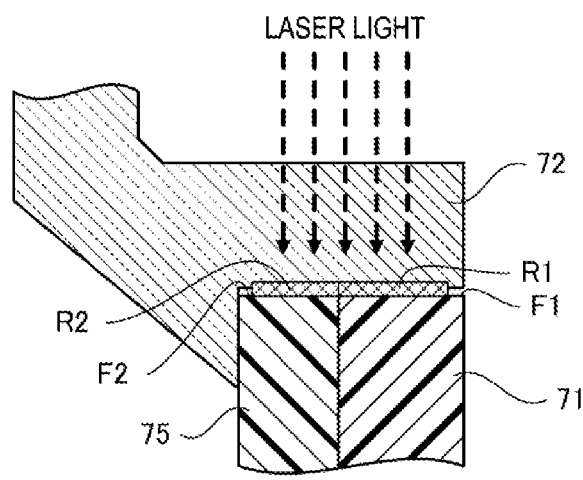
FIG. 6 is a cross-sectional view illustrating joined surfaces after welding the respective members in the portion A of FIG. 3.

More specifically, while pressurizing the first flow path member 71 to which the check valve 73 is assembled against the second flow path member 72, that is, while pressurizing the convex portion 75P against the second flow path member 72, alternatively, while pressing the second flow path member 72 against the first flow path member 71 to which the check valve 73 is assembled, that is, while pressurizing the second flow path member 72 against the convex portion 75P, the convex portion 75P is melted by the laser light so that, as illustrated in FIGS. 5 and 6, the melted convex portion 75P is extended to a region R2 where the check valve holding member 75 is melted and joined to the second flow path member 72 and to a region R1 where the first flow path member 71 is melted and joined to the second flow path member 72, and the check valve holding member 75 and the second flow path member 72, and the first flow path member 71 and the second flow path member 72 are welded together.

Note that when the convex portion 71P is provided on the joining surface F1 of the first flow path member 71 that is joined to the second flow path member 72, in the region R1 where the first flow path member 71 and the second flow path member 72 are joined, the melted convex portion 71P is also extended to weld the first flow path member 71 and the second flow path member 72 together.

When the joining surface F1 and the joining surface F2 are viewed in plan view from an irradiation direction of the laser light, the laser light to be irradiated in the welding step is irradiated as spot light centered around a boundary between the first flow path member 71 and the check valve holding member 75 so as to circulate around an entire periphery of the ink flow path. The intensity and spot diameter of the laser light are at least such that the convex portion 75P can be melted and extended to the joining surface F1 and the joining surface F2.

In addition, as a preferable example, a Nd:YAG laser having a center wavelength of 800 to 1100 nm is used.

According to Embodiment 1, the following advantages can be obtained.

In the manufacturing step of the check valve unit 70, the first flow path member 71 and the second flow path member 72 are welded together, and the second flow path member 72 and the check valve holding member 75 configured to hold the valve body 74 are also welded together. Therefore, it is possible to suppress the disengagement of each of the assembled members such as the check valve 73, for example, due to the stress of pressurizing and depressurizing the ink, and it is possible to improve the durability of the check valve unit 70.

In addition, since the second flow path member 72 and the check valve holding member 75 are welded together at the same time when the first flow path member 71 and the second flow path member 72 are welded together, the welding step can be simplified compared with a case where each welding is performed individually.

Since the joining surface F1 of the first flow path member 71 that is joined to the second flow path member 72, and the joining surface F2 of the check valve holding member 75 that is joined to the second flow path member 72 are directly melted with the laser light transmitted through the second flow path member 72, which is formed of the laser light transmissive material, to join the respective members, a highly durable joining is possible.

Additionally, the convex portion 75P formed so as to protrude around the entire periphery of the ink flow path on the joining surface F2 of the check valve holding member 75 that is joined to the second flow path member 72 is melted with the laser light, and the melted convex portion 75P is pressurized, extended to the region R2 where the check valve holding member 75 is melted and joined to the second flow path member 72 and to the region R1 where the first flow path member 71 is melted and joined to the second flow path member 72, and welded, so that it is possible to suppress the formation of a gap between the region R2 and the region R1. In addition, the first flow path member 71, the second flow path member 72, and the check valve holding member 75 can be joined collectively. As a result, the durability of the check valve unit 70 can be further improved.

In the manufacturing step of the check valve unit 70, in the welding step between the first flow path member 71 and the second flow path member 72, and the welding step between the second flow path member 72 and the check valve holding member 75, the laser light transmitted through the second flow path member 72, which is formed of the laser light transmissive material, can directly melt the joining surface F1 of the first flow path member 71 that is joined to the second flow path member 72, and the joining surface F2 of the check valve holding member 75 that is joined to the second flow path member 72, so that the respective members can be joined. As a result, it is possible to provide the check valve unit 70 having high durability in which the disengagement of each of the assembled members such as the check valve 73 is suppressed, for example, due to the stress of pressurizing and depressurizing the ink.

2. Embodiment 2

Figure 7:
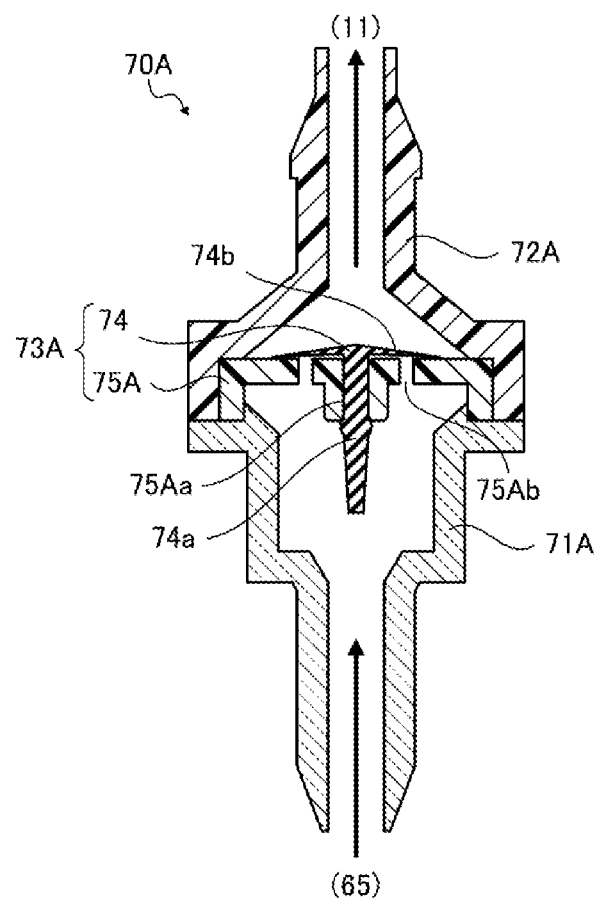
FIG. 7 is a cross-sectional view illustrating a configuration of a check valve unit as a liquid flow path member according to Embodiment 2.

Referring to FIG. 7, a check valve unit 70A as a liquid flow path member according to Embodiment 2 will be described. Note that the same constituent elements as in Embodiment 1 are designated by the same reference numerals, and the duplicated description will be omitted.

The check valve unit 70A includes a first flow path member 71A, a second flow path member 72A, and a check valve 73A. The check valve 73A includes the valve body 74 and a check valve holding member 75A configured to hold the valve body 74.

Regarding the check valve unit 70 in Embodiment 1, it is described that the first flow path member 71 and the check valve holding member 75 are formed of the laser light absorbing material and the second flow path member 72 is formed of the laser light transmissive material. However, regarding the check valve unit 70A, the second flow path member 72A and the check valve holding member 75A are formed of the laser light absorbing material, and the first flow path member 71A is formed of the laser light transmissive material.

In addition, the check valve 73A is assembled to the second flow path member 72A. Therefore, the shapes of the first flow path member 71A, the second flow path member 72A, and the check valve holding member 75A are different from the shapes used in Embodiment 1 and are the shapes as illustrated in FIG. 7.

The check valve holding member 75A includes a bearing 75Aa configured to support the shaft portion 74a in a central portion, and includes a plurality of passage holes 75Ab around the shaft portion 74a for passing ink.

Further, in a manufacturing step of the check valve unit 70A, the first flow path member 71A and the check valve holding member 75A are welded together, and the first flow path member 71A and the second flow path member 72A are also welded together.

Specifically, by melting a joining surface of the second flow path member 72A that is joined to the first flow path member 71A, with the laser light passing through the first flow path member 71A, the first flow path member 71A and the second flow path member 72A are welded together, and by melting a joining surface of the check valve holding member 75A that is joined to the first flow path member 71A, with the laser light passing through the first flow path member 71A, the check valve holding member 75A and the first flow path member 71A are welded together.

Also according to Embodiment 2, the first flow path member 71A and the second flow path member 72A are welded together, and the first flow path member 71A and the check valve holding member 75A configured to hold the valve body 74 are welded together. Therefore, it is possible to suppress the disengagement of each of the assembled members such as the check valve 73A, for example, due to the stress of pressurizing and depressurizing the ink, and it is possible to improve the durability of the check valve unit 70A.

Note that, in the embodiments described above, the welding step is described as a method for welding using the laser light, but the welding step is not limited to the welding using the laser light. For example, in the configuration of the check valve unit 70A in Embodiment 2, a method may also be used in which the joining surfaces of the check valve holding member 75A and the second flow path member 72A are brought into contact with a heated metal plate to be melted in a state where the check valve 73A is assembled to the second flow path member 72A, and the melted joining surfaces are pressed against a joining surface of the first flow path member 71A to be welded.

Also according to this method, the first flow path member 71A and the second flow path member 72A are welded together, and the first flow path member 71A and the check valve holding member 75A configured to hold the valve body 74 are welded together. Therefore, it is possible to suppress the disengagement of each of the assembled members such as the check valve 73A, for example, due to the stress of pressurizing and depressurizing the ink, and it is possible to improve the durability of the check valve unit 70A.

What is claimed is:
1. A method for manufacturing a liquid flow path member including
   a first flow path member constituting one side of a liquid flow path,
   a second flow path member constituting another side of the liquid flow path, and
   a check valve including a valve body configured to stop a backflow of the liquid in the liquid flow path and a check valve holding member configured to hold the valve body, the method comprising:
   a welding step for welding the first flow path member or the second flow path member to the check valve holding member, and also welding the first flow path member to the second flow path member;
   forming the first flow path member and the check valve holding member using a laser light absorbing material; and
   forming the second flow path member using a laser light transmissive material, wherein the welding step includes welding the first flow path member to the second flow path member by melting a joining surface of the first flow path member that is joined to the second flow path member, with laser light passing through the second flow path member; and welding the check valve holding member to the second flow path member by melting a joining surface of the check valve holding member that is joined to the second flow path member, with the laser light passing through the second flow path member.

2. The method for manufacturing a liquid flow path member according to claim 1, the method further comprising:

forming a convex portion protruding around an entire periphery of the liquid flow path at the joining surface of the check valve holding member that is joined to the second flow path member, wherein the welding step includes, melting the convex portion by the laser light while pressurizing the convex portion against the second flow path member or while pressurizing the second flow path member against the convex portion, causing the melted convex portion to extend to a region where the check valve holding member and the second flow path member are joined, and a region where the first flow path member and the second flow path member are joined, and thereby welding the joining surface of the check valve holding member to the second flow path member, and welding the joining surface of the first flow path member to the second flow path member.

3. A liquid flow path member comprising:

a first flow path member constituting one side of a liquid flow path;

a second flow path member constituting another side of the liquid flow path; and a check valve including a valve body configured to stop a backflow of the liquid in the liquid flow path and a check valve holding member configured to hold the valve body, wherein the first flow path member and the check valve holding member are formed of a laser light absorbing material, the second flow path member is formed of a laser light transmissive material, and the first flow path member and the second flow path member are welded together, and the second flow path member and the check valve holding member are welded together.

* * * * *